July 25, 1961  A. W. GRUMBINE  2,993,790
PROCESSES FOR MAKING RESISTS
Filed April 18, 1958

FIG. 1

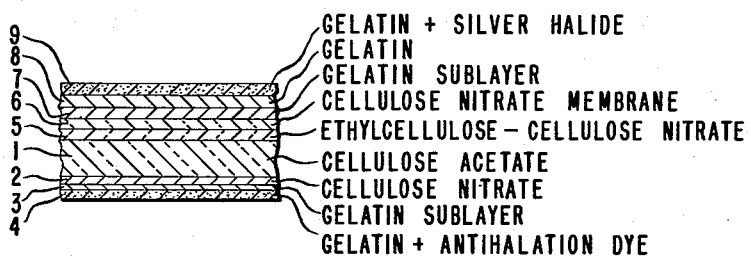

- GELATIN + SILVER HALIDE
- GELATIN
- GELATIN SUBLAYER
- CELLULOSE NITRATE MEMBRANE
- ETHYLCELLULOSE – CELLULOSE NITRATE
- CELLULOSE ACETATE
- CELLULOSE NITRATE
- GELATIN SUBLAYER
- GELATIN + ANTIHALATION DYE

FILM OF FIG. 1 EXPOSED, DEVELOPED, FIXED, WASHED, LAID DOWN ON COPPER PLATE AND LAYERS AND COMPOSITE LAYERS 1-5 STRIPPED TO LEAVE THE FOLLOWING LAYDOWN STRUCTURE.

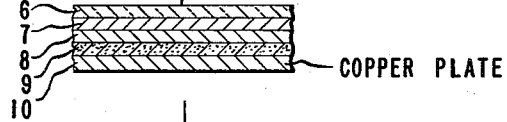

— COPPER PLATE

> FIG. 2

LAYDOWN TREATED WITH METHANOL AND WHILE WET TREATED WITH WATER TO REMOVE COMPOSITE LAYERS 6-8 AND LEFT IN WATER TO FORM THE RESIST:

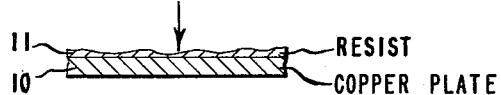

— RESIST
— COPPER PLATE

INVENTOR
ARTHUR WILLIAM GRUMBINE

BY
ATTORNEY

2,993,790
PROCESSES FOR MAKING RESISTS
Arthur William Grumbine, Parlin, N.J., assignor to E. I. du Pont de Nemours and Company, Wilmington, Del., a corporation of Delaware
Filed Apr. 18, 1958, Ser. No. 729,249
5 Claims. (Cl. 96—35)

This invention relates to an improvement in processes for making resists. More particularly, it relates to an improvement in processes for the removal of the stripping layer and protective membrane from an exposed, developed and fixed image-bearing layer of a photographic stripping film in the process of making a resist and particularly a gravure resist.

In U.S. Patents White et al. 2,638,417, Boyer 2,650,877 and Boyer and Grumbine 2,650,878, and in Grumbine U.S. application Ser. No. 636,534, filed January 28, 1957, there are described various photographic stripping films, processes for forming resists and processes for etching metal printing surfaces, e.g., plates and cylinders from such resists. The photographic images can be formed in such films by exposure in various ways including those described in said patents as well as those described in Kott U.S. Patent 2,628,903. Also the images can be developed and fixed in the various ways disclosed in the foregoing patents and applications to form a hardened resist-formable layer.

In the foregoing films the use of a cellulose nitrate membrane in conjunction with a dry stripping ethyl cellulose/cellulose nitrate layer as the permanent support has been found to have advantages. This composite membrane serves two distinct purposes in the photographic stripping films in question. First, it permits dry-stripping of the temporary heavy film base or support after "laydown" or adherence of the image-bearing film to the plate or cylinder. Second, it protects the image-bearing water-permeable colloid emulsion layer which has undergone laydown during laydown of additional image-bearing layers or prints onto the same plate or cylinder.

Various organic solvents have been proposed for the dissolving of this membrane (sometimes referred to as the permanent support of a photographic stripping film) in order to form an etching resist. Among these solvents are acetone, mixtures of acetone and methanol, or ethanol or the monomethyl or monoethyl ether of ethylene glycol, the monoethyl ether of ethylene glycol and mixtures of diacetone alcohol and isopropyl alcohol. These solvents and solvent mixtures can also contain up to 5% of water.

It usually requires from 10 to 20 minutes to remove the composite membrane after laydown on the surface of the printing plate or cylinder to be etched. Large quantities of solvent, with several complete changes to fresh solvent, are required to assure removal of the membrane. The solvents mentioned present economic problems. Also, due to the relatively long period of treatment, there are health and safety hazards.

An object of this invention is to provide an improved process for removing the cellulose-nitrate-ethyl cellulose/cellulose nitrate composite layer from a resist-forming layer of an exposed and developed photographic stripping film. Another object is to provide such a process which utilizes an economical solvent. A further object is to provide such a process which requires a shorter time-period than prior procedures. A still further object is to provide such a process which results in complete removal of the composite membrane without adverse effect on the image-bearing layer. Still further objects will be apparent from the following description of the invention.

It has been discovered, in a process for making etching resists, that the membrane of a photographic stripping film of the type described in the Grumbine patent application can physically be removed without completely dissolving it (a) by treating the photographic image-bearing element containing such a membrane which has a water-insoluble ethyl cellulose/cellulose nitrate stripping layer on one surface and on the other surface a thin gelatin substratum and a layer having a thickness of 0.06 to 0.35 mil of water-soluble gelatin, with a water-miscible solvent predominating in at least one alkanol of 1 to 2 carbon atoms having a solvent action on cellulose nitrate by thoroughly wetting the surface of said composite layer with said solvent, and (b) before the membrane is dissolved, treating the resulting membrane with warm water. For example, the composite membrane can be treated with such a water-miscible solvent for a period of 10 to 60 seconds and the resulting somewhat porous membrane then treated with warm water to remove it. In many cases it is sufficient to merely wet or impregnate the surface of the composite membrane with the water-miscible solvent. The adjacent unhardened gelatin is then removed from the image-bearing layer in a conventional way by dissolving it off, or by washing it away upon continued immersion in the warm water or by a separate water bath, the water being above 90° F. and preferably at 95° F. to 150° F. This results in a relief image, or resist, on the surface of the printing plate or cylinder. The stripping layer in question, as disclosed in U.S.P. 2,638,417, is 0.00008 to 0.0003 inch thick and contains 6 to 9 parts of water-insoluble ethyl cellulose to 4 to 1 parts of cellulose nitrate, by weight.

Suitable water-miscible solvents including anhydrous methanol, aqueous methanol containing up to 5% by weight of water, anhydrous ethanol, aqueous ethanol containing up to 2% by weight of water, mixtures of methanol and ethanol free from water and containing up to about 5% by weight of water, mixtures of ethanol or ethanol and acetone, mixtures of methanol or ethanol and acetone containing up to 5% by weight of water based on the mixture, and equal parts by weight of anhydrous methanol, ethanol and acetone. Suitable mixtures are given in the following table:

TABLE

*Methanol-ethanol-acetone-water mixtures*

| Ethanol (Absolute) | Methanol | Acetone | Water |
|---|---|---|---|
|  | 100 |  |  |
|  | 95 |  | 5 |
|  | 80 | 20 |  |
|  | 60 | 40 |  |
|  | 50 | 50 |  |
|  | 40 | 60 |  |
|  | 20 | 80 |  |
|  | 10 | 90 |  |
|  | 45 | 45 | 10 |
|  | 90 | 5 | 5 |
| 15 | 85 |  |  |
| 48 | 50 |  | 2 |
| 5 | 90 |  | 5 |
| 100 |  |  |  |
| 98 |  |  | 2 |
| 96 |  | 2 | 2 |
| 93 |  | 5 | 2 |
| 88 |  | 10 | 2 |
| 85 |  | 10 | 5 |
| 60 |  | 40 |  |
| 50 |  | 50 |  |
| 25 |  | 75 |  |
| 33 | 33 | 33 |  |

In the preferred aspect of the invention, the outer surface of the composite membrane is thoroughly wetted or impregnated with a small quantity of methanol containing not more than 5% of water for a period of 10 to 60 seconds. The resulting somewhat porous membrane is then treated with warm water to remove it as described above.

The process is particularly efficacious in treating the laydown (containing a hardened image-containing colloid silver layer) on an etchable metal printing surface from a photographic stripping film of the type disclosed and claimed in assignee's copending application Ser. No. 636,534, which film has a thin gelatin substratum from 0.016 to 0.032 mil on the surface of the cellulose nitrate membrane, a contiguous gelatin layer from 0.06 to 0.35 mil and then a water-permeable organic colloid-silver halide emulsion layer. The gelatin of the latter and preferably both gelatin layers are soluble in water at 40° C. to the extent of at least 10% by weight. The cellulose nitrate membranes of such films are from 0.00008 to 0.0003 inch thick and bear the ethyl cellulose/cellulose nitrate layer. The methanol solution attacks the nitrocellulose and first leaves a highly porous web allowing the water of the treating bath for removing the sublayer and the unhardened gelatin contiguous layer to quickly penetrate and solubilize such layers. The highly porous membrane then becomes translucent, or opaque, and floats away freely in a period of seconds by the action of a warm water bath. Generally about 25 to 40 seconds are adequate whereas the solvents mentioned above require 10 to 20 minutes for the removal of the membrane by complete dissolution.

The use of methanol as the treating agent for the nitrocellulose has the unexpected and surprising effect that the membrane becomes translucent, or opaque, when subjected to a bath of warm water. This has the important advantage that it serves as a positive physical indicating means whereby the technician can determine the complete removal of the membrane. The resulting image-containing, water-permeable colloid layer can then be washed to remove the unhardened portions of the layer leaving an etchable resist on the metal printing surface. The metal surface can then be etched in any conventional manner to produce an intaglio image. When the other solvents described above are used in like manner, the membrane becomes translucent or opaque.

As indicated above, the invention is particularly useful with the photographic dry-stripping films of assignee's Grumbine application Ser. No. 636,534, filed January 28, 1957, and any of the stripping films disclosed therein having a cellulose nitrate membrane can be used. The photographic gelatino silver halide emulsion layers of the stripping films preferably are markedly sensitive to blue and may be especially sensitized to higher wavelengths of light, e.g., green and red light. Thus the layers can be orthochromatic or panchromatic photographic silver halide emulsion layers.

The film base can be composed of any polymeric material capable of forming flexible, self-supporting hydrophobic films. Many suitable such supports are known in the art. Thus, they may be composed of a cellulose derivative, e.g., cellulose acetate, cellulose propionate, cellulose acetate/propionate, cellulose acetate/butyrate or other simple or mixed carboxylic acid esters of cellulose; a superpolymer, e.g., a polyamide, for instance, polyhexamethylene adipamide; poly(vinyl chloride co vinyl acetate) polyvinyl acetals of aldehydes such as formaldehyde, acetaldehyde and butyraldehydes; polyalkylene terephthalates, e.g., polyethylene terephthalate. Films composed of such materials may have a thin waterproofing layer on one or both surfaces. Suitable such layers can be composed of vinylidene copolymers, e.g., vinylidene chloride/isobutylene, vinylidene chloride/acrylonitrile, and vinylidene chloride/methacrylate/itaconic acid copolymers. The vinylidene chloride copolymer coated polyalkylene terephthalate oriented films of Alles et al. U.S. Patent 2,627,088 are particularly useful supports.

With regard to the silver halide emulsion layer, the light-sensitive salt may be silver chloride, silver bromide, silver chlorobromide, silver iodobromide, etc. It preferably contains a soft gelatin composition as the binding agent. That is, it should be capable of being later differentially hardened in a developing or bleaching bath so that a relief image can be formed by washing away unhardened emulsion. In addition, the ratio of gelatin to silver halide is preferably high, i.e., a relatively large quantity of gelatin to a relatively small quantity of silver halide. A satisfactory range is from 2 to 5 parts of gelatin to 1 part of silver halide.

In the accompanying drawing which constitutes a part of this application:

FIG. 1 is a vertical cross-sectional view of a film element useful in the invention and more fully described in Example I, and FIG. 2 is a flow-diagram with a brief description of processing an element as shown in FIG. 1 to form a resist on a copper plate.

In making resists from a film element of the invention, it is exposed by one of the usual manners to produce the desired latent image in the photosensitive layer. For instance, in making a gravure plate, the film is exposed through a screen for a suitable time and then through a continuous tone positive, or vice versa. Other conventional types of screens and sequences of exposure can be used, including the screens and procedures disclosed in Kott U.S. Patent 2,628,903, granted February 17, 1953. The exposed film is then developed in a hardening developer as described in Boyer et al. Patents 2,650,877 and 2,650,878 (particularly in col. 1, line 22 to line 11, col. 2), and in White et al. 2,638,417, and further treated and used to form an etched plate as disclosed in said patents.

The invention will be further illustrated by, but is not intended to be limited to, the following examples.

EXAMPLE I

A photographic stripping film (described in Example I and shown in FIG. 1 of the drawing of aforesaid application Ser. No. 636,534, and in the accompanying drawing) comprising a 5-mil cellulose acetate film base 1 having, in order on its reverse surface, a thin cellulose nitrate layer 2, a gelatin sublayer 3 and an antihalation layer 4 containing a gelatin, chrome alum and Acid Magenta O (Rowe's Colour Index No. 692) and, in order, on its obverse surface a 0.2-mil, dry-stripping layer 5 of ethyl cellulose/cellulose nitrate (34%–66% by weight), a 0.2-mil cellulose nitrate membrane 6, a 0.02-mil soluble gelatin substratum 7, a 0.16-mil soluble gelatin layer 8 and an orthochromatically sensitized gelatin chlorobromide emulsion layer 9 containing 25 mole percent silver chloride was exposed in a vacuum printing frame as follows:

The film was exposed through a 150-line (2.5:1 ratio) conventional gravure screen for 20 seconds to a 25-watt lamp at 8 feet from the vacuum frame. The film was then exposed to an E.K. step wedge for 60 seconds to a 100-watt lamp covered with a Corning No. 5840 UV filter at 8 feet from the vacuum frame.

The element was then processed as follows:

(1) Immersed for 3 minutes at 68° F. in a solution of the following composition:

| | | |
|---|---|---|
| Sodium metabisulfite | grams | 5 |
| Sodium sulfite | do | 10 |
| Metol | do | 1 |
| Hydroquinone | do | 2 |
| Pyrogallol | do | 6 |
| Potassium bromide | do | 3 |
| Anionic wetting agent (Eumercin NB 10% aqueous) | ml | 2 |
| Water to make 1000 ml. | | |

(2) Immersed for 2 minutes at 68° F. in a solution of the following composition:

Sodium carbonate (monohydrate) _____ grams__ 100
Anionic wetting agent (Eumercin NB 10% aqueous _____ ml__ 2
Water to make 1000 ml.

(3) Washed for 1 minute in water 68° F.
(4) Fixed for 3 minutes at 68° F. in a solution having the following composition:

Sodium thiosulfate _____ grams__ 200
Boric acid _____ do____ 15
Water to make 1000 ml.

(5) Washed for 10 minutes in water at 68° F.
(6) The film is then dried.

The exposed, developed, fixed and washed film was laid down on a copper plate 10 and the temporary cellulose acetate base was stripped from the laid down element. The entire surface of the remaining protective composite membrane was then flooded with 100% methanol and allowed to soak for about 15 seconds. The copper plate was then placed in a tray of water at 125° F. The composite membrane turned to a white, opaque color and floated from the image-containing gelatin layer in the form of a tough skin within a period of 30 seconds and without the need for manual assistance. The copper plate with its adherent image-containing layer was left in the bath of water at 125° F. for an additional 10 minutes to dissolve away all unexposed, unhardened gelatin, thus forming a relief image of varying thickness of hardened gelatin on the copper proportional to the developed silver densities.

After thorough drying of the gelatin relief image, or resist 11, and covering bare areas of copper with asphaltum as is common practice in the art, relief images were etched into the copper by employing ferric chloride solutions of 45°, 43°, 42° and 41° Baumé, respectively.

EXAMPLE II

The procedure of Example I was repeated using 100% methanol and methanol containing not more than 5% water for periods varying from 5 seconds to 60 seconds and with wash waters at 100° to 150° F. for removing the white, opaque composite membranes with similar results as in said Example I.

Similar results can be obtained by substituting for the methanol solution in these examples, any of the solvents mentioned above and listed in the above table. As indicated above, the invention is not limited to the preparation of resists on flat metal printing plates but is also useful in the preparation of printing cylinders, e.g., gravure cylinders. In making etched cylindrical printing plates, after the composite membrane has been removed following the treatment with methanol, the unhardened portions of the gelatin can be removed from the image-containing layer by spraying the surface with warm water.

The laying down of processed stripping film prints on a cylinder is done in the same manner as described above for flat plates except that considerably larger equipment is used and the cylinder takes the place of one of the rubber rollers necessary when a flat plate is used.

After laydown, the heavy base support is stripped away leaving the composite ethyl cellulose/cellulose nitrate-cellulose nitrate layer attached to the laydown gelatin and emulsion layers. The cylinder (copper) is then rotated while methanol is poured on to it in just sufficient quantity to wet the entire surface with a thin layer of the methanol. Approximately 30 seconds after the last area has been covered with the methanol, water adjusted to 125° F. is applied to the cylinder with a hose. The composite membrane turns white when water contacts it and in approximately 45 seconds the membrane skins release and drop into a tray beneath. After all membranes have been removed, the cylinder is lowered into a large tray of water at 125° F. and revolved for ten additional minutes to dissolve away the unhardened gelatin and form the resist for etching.

Alternatively, the cylinder can be lowered into a tray of water at 125° F. instead of using a hose. The skins can then be picked out of the tray. Unless the tray is large it sometimes becomes awkward to pick out the skins.

An advantage of this invention is that the novel process is simple and dependable. A further advantage is that it provides a positive way of identifying when membrane removal is complete. After the methanol treatment the membrane can be removed by simply immersing the plate in warm water which causes the membrane to become translucent or opaque and allows it to float away. A further advantage of the process is that it is rapid, and processing time is markedly reduced from a matter of 10 to 15 minutes for the removal of the membrane to a matter of seconds. A further advantage of the invention is that it uses a readily available and economical solvent. Still other advantages will be apparent from the above description.

What is claimed is:

1. In a process for making an etching resist from an exposed, developed and fixed thin flexible photographic film having a cellulose nitrate membrane as the permanent support and a water-insoluble ethyl cellulose/cellulose nitrate stripping layer on its outer surface and on its other surface in sequential direct contact a thin gelatin substratum, a contiguous gelatin layer having a thickness from 0.06 to 0.35 mil, said gelatin being soluble in water at 40° C. to the extent of at least 10% by weight and then a hardened gelatin silver image-bearing layer in contact with an etchable printing surface; the improvement which comprises wetting the outer surface of the composite membrane comprising said cellulose nitrate membrane and said stripping layer with a water-miscible solvent taken from the group consisting of anhydrous methanol, anhydrous ethanol, ethanol containing water in an amount up to 2% by weight, methanol containing water in an amount up to 5% by weight, anhydrous mixtures of 2 to 3 solvents taken from the group consisting of methanol, ethanol and acetone, and such mixtures containing water in an amount up to 5% by weight, and mixtures of methanol and acetone containing 5 to 10% by weight of water, and while said membrane is still wet with the solvent, removing the resulting porous membrane by treating it with water in the liquid phase at a temperature above 90° F.

2. The improvement in a process according to claim 1 wherein the membrane is wetted with the solvent for a period of 10–60 seconds before the membrane is removed by treating it with water.

3. In a process for making an etching resist from an exposed, developed and fixed thin flexible photographic film having a cellulose nitrate membrane as the permanent support, said membrane having on its outer surface a water-insoluble ethyl cellulose/cellulose nitrate stripping layer comprising 6 to 9 parts of the former per 4 to 1 parts of the latter, and having on its inner surface in sequential direct contact a thin gelatin substratum, a contiguous gelatin layer having a thickness from 0.06 to 0.35 mil, said gelatin being soluble in water at 40° C. to the extent of at least 10% by weight and then a hardened gelatin silver image-bearing layer in contact with an etchable metal printing surface; the improvement which comprises wetting the surface of the composite membrane comprising the cellulose nitrate membrane and said stripping layer with 95–100% methanol and then, while said membrane is still wet, removing the membrane by treating it with water in the liquid phase at a temperature from 100° F. to 150° F.

4. In a process for making an etching resist from an exposed, developed and fixed thin photographic film having a cellulose nitrate membrane as the permanent support, said membrane having on its outer surface a water-insoluble ethyl cellulose/cellulose nitrate stripping layer comprising 6 to 9 parts of the former per 4 to 1 parts of the latter and having on its inner surface in sequential direct contact a thin gelatin substratum, a contiguous gelatin layer from 0.06–0.35 mil in thickness, said gelatin being soluble in water at 40° C. to at least 10% by weight, and then a hardened gelatin-silver image-bearing layer in contact with an etchable metal printing surface, the improvement which comprises wetting the surface of the composite membrane, comprising said cellulose nitrate layer and said stripping layer with 95–100% methanol for a period of 5 to 60 seconds and then removing the membrane while it is still wet with methanol by treating it with water at a temperature from 100 to 150° F.

5. In a process for making an etching resist from an exposed, developed and fixed thin photographic film having a cellulose nitrate membrane as the permanent support, said membrane having on its outer surface a cellulose/cellulose nitrate stripping layer comprising 6 to 9 parts of the former per 4 to 1 parts of the latter and having on its inner surface in sequential direct contact a thin gelatin substratum, a contiguous gelatin layer from 0.06–0.35 mil in thickness, said gelatin being soluble in water at 40° C. to at least 10% by weight, and then a hardened gelatin-silver image-bearing layer in contact with an etchable metal printing surface, the improvement which comprises wetting the surface of the composite membrane with 95–100% methanol for a period of 5 to 60 seconds and then treating said membrane, while it is still wet with methanol, with water at 100° to 150° F. whereby it becomes opaque in appearance, and removing the opaque membrane.

References Cited in the file of this patent

UNITED STATES PATENTS

| | | |
|---|---|---|
| 2,638,417 | White et al. | May 12, 1953 |
| 2,650,877 | Boyer et al. | Sept. 1, 1953 |
| 2,650,878 | Boyer et al. | Sept. 1, 1953 |

OTHER REFERENCES

Ott et al.: "Cellulose and Cellulose Derivatives," 2nd ed., (vol. 5 of High Polymers), part 3, 1955, Interscience Publishers, Inc., N.Y., pp. 1452–1453.